United States Patent [19]

Osborn

[11] 3,757,088
[45] Sept. 4, 1973

[54] ELECTRICALLY CONDUCTING ELASTOMERS AND ELECTRICAL MEMBERS EMBODYING THE SAME

[75] Inventor: Robert H. Osborn, Green Acres, Del.

[73] Assignee: Hercules Incorporated, Wilmington, Del.

[22] Filed: Feb. 29, 1972

[21] Appl. No.: 230,268

[52] U.S. Cl............ 219/553, 117/232, 174/102 SC, 252/511, 338/214, 338/331
[51] Int. Cl. ............................................ H05b 3/10

[58] Field of Search............................ 117/230, 232; 252/510, 511; 328/210, 214; 174/102 SC; 219/540, 553

[56] References Cited
UNITED STATES PATENTS
2,878,353  3/1959  Thornton............................ 252/510
3,096,210  7/1963  Boonstra............................. 117/232

*Primary Examiner*—E. A. Goldberg
*Attorney*—Charles L. Board et al.

[57] ABSTRACT

Electrically conducting elastomers having utility as flexible heating elements and the like are disclosed.

16 Claims, 2 Drawing Figures

PATENTED SEP 4 1973					3,757,088

ELECTRICALLY CONDUCTING ELASTOMERS AND ELECTRICAL MEMBERS EMBODYING THE SAME

This invention relates to novel electrically conducting elastomers and to electrical members embodying same.

Particularly, this invention relates to elastomers capable of conducting electricity, the elastomers being cross-linked elastomeric polymers based on at least one epihalohydrin having essentially uniformly dispersed therein finely divided carbon in an amount of from about 50 parts to about 120 parts for each 100 parts by weight of polymer.

The electrically conducting elastomers of this invention can be employed as electrical conductors in those applications where particular advantage can be made of their elastomeric properties and of their resistivity which is less than about 1,000 ohms-cm. Thus, for example, the electrically conducting elastomers of this invention have utility in the manufacture of flexible electrical heating elements, flexible electrically conducting members, and the like.

In accordance with this invention there are provided novel electrically conducting elastomers that are derived by crosslinking compositions comprised of an elastomeric polymer based on at least one epihalohydrin and finely divided carbon in an amount of from about 50 parts to about 120 parts for each 100 parts of polymer; the preferred amount of carbon being from about 50 parts to 100 parts for each 100 parts by weight of polymer.

The electrically conducting elastomers of this invention are prepared by first compounding an essentially homogeneous composition comprised of an elastomeric epihalohydrin polymer, a curing agent for the polymer, and carbon in finely divided form. The composition is subsequently shaped into a desired configuration or applied as a coating to a substrate or the like and subjected to heat for a period of time sufficient to crosslink the polymer.

The finely divided carbon employed in this invention will have a mean particle diameter less than about 100 millimicrons. Carbon types suitable for use in the invention are SRF (semireinforcing furnace black) which has a mean particle diameter of about 73 millimicrons; FEF (fast extruding furnace black) which has a mean particle diameter of about 46 millimicrons; HAF (high abrasion furnace black) which has a mean particle diameter of about 25 millimicrons; ISAF (intermediate super abrasion furnace black) which has a mean particle diameter of about 20 millimicrons; and SAF (super abrasion furnace black) which has a mean particle diameter of about 17 millimicrons.

Epihalohydrin polymers employed in this invention are the homopolymers of an epihalohydrin such as epichlorohydrin, and copolymers of an alkylene oxide such as ethylene oxide and propylene oxide and at least one epihalohydrin wherein from about 30 mole percent to about 70 mole percent of the copolymer is derived from the epihalohydrin. Examples of homopolymers include poly(epichlorohydrin) and poly(epibromohydrin). Examples of copolymers include epichlorohydrin—ethylene oxide copolymers; epibromohydrin—ethylene oxide copolymers; epichlorohydrin—epibromohydrin—ethylene oxide copolymers; epichlorohydrin—propylene oxide copolymers; epibromohydrin—propylene oxide co-polymers; epichlorohydrin—epibromohydrin—propylene oxide copolymers; and epichlorohydrin—ethylene oxide—propylene oxide copolymers. The polymers can be essentially wholly amorphous or a mixture of amorphous and crystalline polymers. For applications of this invention, the amount of crystalline polymer will preferably be less than 30 percent and preferably less than about 20 percent by weight of the polymer. Mixtures of the homopolymers, mixtures of the copolymers, and mixtures of the homopolymers and copolymers can be employed in carrying out this invention if desired. Polymers derived by copolymerizing epichlorohydrin and epibromohydrin can be employed also.

The polymers can be prepared by contacting at least one epihalohydrin or a mixture of at least one epihalohydrin and an alkylene oxide with an organoaluminum compound, preferably one which has been reacted with an ether such as diethyl ether or tetrahydrofuran and then reacted with from about 0.1 mole to about 1.5 moles of water per mole of organoaluminum compound and then reacted with about 0.01 mole to about 1.5 moles of a chelating agent such as acetylacetone, benzoylacetone, acetoacetic acid, ethyl glycolate, oxalic acid and glyoxal monoxime. Examples of organoaluminum compounds are triethylaluminum, triisobutyl-aluminum, and diethylaluminum hydride.

The polymerization reaction is generally carried out in the presence of an inert, liquid, organic diluent but can be carried out in an essentially bulk polymerization process. The temperature of the polymerization process can be varied over a wide range, generally from about −80°C. to about 250°C., and while atmospheric pressure is usually used, the pressure can be varied from subatmospheric up to several atmospheres.

The polymers generally contain a small amount (i.e., from about 0.1 to about 2 percent by weight) of antioxidant added at the time of preparation. Exemplary of preferred antioxidants are 4,4′-thio-bis (6-tertiary-butyl-m-cresol); the reaction product of crotonaldehyde and 3-methyl-6-tertiary-butyl phenol; 2,6-ditert-butyl-p-cresol; phenyl-beta-naphthylamine; di-betanaphthyl-p-phenylenediamine; sym-di-beta-naphthyl-p-phenylenediamine; the reaction product of diphenylamine and acetone; polymerized trimethyldihydroquinoline; and nickel dibutyldithiocarbamate.

The polymers can be crosslinked with a heterocyclic compound selected from the group consisting of 2-mercaptoimidazolines (such as ethylene thiourea); thiazoline-2-thiones; and 2-mercaptopyrimidines in combination with at least one metal compound selected from the group consisting of salts of aromatic carboxylic acids, salts of aliphatic carboxylic acids, salts of carbonic acid, salts of phosphorous acid, salts of silicic acid and oxides of the metals of groups II-A, II-B and IV-A of the Periodic Table (Lange's Handbook of Chemistry, 8th Edition, pages 56–57, 1952). A specific example of a metal oxide is red lead, sometimes referred to as lead oxide red ($Pb_3O_4$). In addition to the above crosslinking agents, urea, thiourea, ammonia and ammonium salts can be used. Polyamines can be used also to crosslink the polymers. Exemplary of the polyamines are the aliphatic amines such as ethylenediamine, propylenediamine, tetramethylenediamine, hexamethylenediamine, and diethylenetriamine; cyclic amines such as melamine, piperazine, pyrazine, and triethylenediamine; aromatic amines such as p-phenylenediamine, naphthylenediamine, and biphenyldiamine; and polymeric amines such as poly(2-methyl-5-vinyl pyridine). Instead of the free amine, a salt of the amine can be used. Internal salts of the amines can also be used as, for example, hexamethylenediamine carbamate, which type of salt decomposes to the free amine at or below curing or crosslinking temperature.

When using a heterocyclic compound in combination with a metal compound to effect crosslinking, the optimum amount will depend upon the degree of crosslinking desired. Generally, the amounts added (based on the weight of the polymer) will be within the following ranges: metal compound from about 0.1 percent to about 15 percent, heterocyclic compound from about 0.3 percent to about 5 percent. When crosslinking with a polyamine, urea, thiourea or ammonia, the amount employed will depend primarily upon the degree of crosslinking desired. Generally from about 0.3 percent to about 5.0 percent based on the weight of the copolymer will be employed.

In addition to crosslinking agents and the required amount of carbon, other ingredients can be incorporated. Exemplary of such ingredients (sometimes referred to in the art as "additives") are extenders, pigments, dyes, lakes, plasticizers, softeners, processing lubricants and stabilizers. It is understood that if an additive is employed it will be such as not to affect adversely the electrical properties of the resulting elastomer.

The polymers of an epihalohydrin employed in this invention are high molecular weight solid polymers. The polymers will preferably have a Reduced Specific Viscosity of at least about 0.2, i.e., a molecular weight of at least about 40,000. The term "Reduced Specific Viscosity" (RSV) which is a function of molecular weight is used to designate the specific viscosity measured at 100°C. on an alpha-chloronaphthalene solution of the polymer containing 0.1 g. per 100 ml. of solution divided by the concentration of the solution.

U.S. Pat. Nos. 3,158,580; 3,158,581; and 3,158,591, reference to which is made, disclose and describe polymers employed in this invention and their method of preparation.

Set forth are examples of crosslinkable compositions to be employed in preparing the electrically conducting elastomers of this invention. All parts and percentages are by weight unless otherwise specified. The components of the composition are thoroughly admixed to provide an essentially homogeneous composition prior to crosslinking. In all examples, crosslinkable compositions are made up by mixing on a two-roll mill (rolls maintained at about 175°F.) dry polymer, crosslinking agent, finely divided carbon, and other enumerated additives for about 30 minutes. These compositions are subsequently subjected to heat for a period of time sufficient to crosslink the polymer component of the composition.

In the examples the poly(epichlorohydrin) employed has a molecular weight of about 500,000 and the epichlorohydrin—ethylene oxide copolymer has a molecular weight of about 1,500,000 and contains the monomeric groups in a mole ratio of about 50:50. The sorbitan monostearate functions as a lubricant.

EXAMPLE 1

The following ingredients are milled to provide an essentially homogeneous mass.

| Ingredients | Part(s) |
|---|---|
| Poly(epichlorohydrin) | 100 |
| Sorbitan monostearate | 1 |
| Carbon (FEF) | 80 |
| Ethylene thiourea | 1.5 |
| Red lead | 5 |
| Nickel dibutyldithiocarbamate | 1 |

The composition is placed in a compression type mold (6 × 6 × 0.14 inches) and heated at a temperature of about 340°F. and subjected to greater than 1,000 psi mold pressure for about 45 minutes to effect crosslinking of the poly(epichlorohydrin). The crosslinked elastomer has the following physical properties: modulus (100%)—1,600 psi; tensile — 1,900 psi; elongation — 150 psi; hardness (Shore A) — 90.

EXAMPLE 2

The following ingredients are milled to provide an essentially homogeneous mass:

| Ingredients | Part(s) |
|---|---|
| Epichlorohydrin—ethylene oxide copolymer | 100 |
| Sorbitan monostearate | 1.5 |
| Carbon (FEF) | 80 |
| Ethylene thiourea | 1.5 |
| Red lead | 5 |
| Nickel dibutyldithiocarbamate | 1 |

The composition is placed in a mold like that of Example 1 and subjected to greater than 1,000 psi mold pressure and heated at a temperature of about 340°F. for about 45 minutes to effect crosslinking of the copolymer. The crosslinked elastomer has the following physical properties: modulus (100%) — 1,500 psi; tensile - 1,800 psi; elongation — 150 psi; hardness (Shore A) — 90.

EXAMPLE 3

The following ingredients are milled to provide an essentially homogeneous mass:

| Ingredients | Part(s) |
|---|---|
| Poly(epichlorohydrin) | 100 |
| Sorbitan monostearate | 1 |
| Carbon (ISAF) | 80 |
| Ethylene thiourea | 1.5 |
| Red lead | 5 |
| Nickel dibutyldithiocarbamate | 1 |

The composition is placed in a mold like that of Example 1 and subjected to greater than 1,000 psi mold pressure and heated at a temperature of about 340°F. for a period of about 45 minutes to effect crosslinking of the copolymer. The crosslinked elastomer has the following physical properties: modulus (100%) — 1,100 psi; tensile — 2,300 psi; elongation — 250 psi; hardness (Shore A) — 95.

EXAMPLE 4

The following ingredients are milled to provide an essentially homogeneous mass:

| Ingredients | Part(s) |
|---|---|
| Poly(epichlorohydrin) | 100 |
| Sorbitan monostearate | 1 |
| Carbon black (HAF) | 80 |
| Ethylene thiourea | 1.5 |
| Red Lead | 5 |
| Nickel dibutyldithiocarbamate | 1 |

The composition is placed in a mold like that of Example 1 and subjected to greater than 1,000 psi mold pressure and heated at 340°F. for about 45 minutes to effect crosslinking of the poly(epichlorohydrin). The crosslinked elastomer has the following physical properties: modulus (100%) — 2,650; tensile — 2,650 psi; elongation — 100 psi; hardness (Shore A) — 97.

EXAMPLE 5

The following ingredients are milled to provide an essentially homogeneous mass:

| Ingredients | Part(s) |
| --- | --- |
| Poly(epichlorohydrin) | 100 |
| Sorbitan monostearate | 1 |
| Carbon (FEF) | 50 |
| Carbon (ISAF) | 30 |
| Ethylene thiourea | 1.5 |
| Red lead | 5 |
| Nickel dibutyldithiocarbamate | 1 |

The composition is placed in a mold like that of Example 1 and heated at a temperature of about 340°F. for about 45 minutes to effect crosslinking of the copolymer. The crosslinked elastomer has the following physical properties: modulus (100%) — 1,150; modulus (200%)—2,250; tensile — 2,250 psi; elongation — 200 psi; hardness (Shore A) — 87.

EXAMPLE 6

The following ingredients are milled to provide an essentially homogenous mass:

| Ingredients | Part(s) |
| --- | --- |
| Poly(epichlorohydrin) | 100 |
| Sorbitan monostearate | 1 |
| Carbon (FEF) | 80 |
| Red lead | 5 |
| Nickel dibutyldithiocarbamate | 1 |
| Azelaic acid | 4 |
| Copper dimethyldithiocarbamate | 0.125 |
| Ethylene thiourea | 1.5 |

The composition is placed in a mold like that of Example 1 and subjected to greater than 1,000 psi mold pressure and heated at a temperature of about 340°F. for about 45 minutes to effect crosslinking of the poly(epichlorohydrin). The crosslinked elastomer has the following physical properties: modulus (100%) — 1,050 psi; modulus (200%) — 1,675 psi; tensile — 1,800 psi; elongation — 225 psi; hardness (Shore A) — 92.

EXAMPLE 7

Example 2 is repeated using 50 parts FEF carbon instead of 80 parts and 1 part of sorbitan monostearate instead of 1.5. The elastomer has good physical properties.

Table 1 below sets forth the DC resistivity of the carbon filled crosslinked elastomers of the above examples.

Table 1

| Example No. | DC Resistivity (ohm-cm) |
| --- | --- |
| 1 | 10.0 |
| 2 | 5.1 |
| 3 | 5.6 |
| 4 | 12.6 |
| 5 | 5.6 |
| 6 | 6.9 |
| 7 | 26.0 |

EXAMPLE 8

Example 1 is repeated with the exception that the crosslinking temperature is 320°F. instead of 340°F.

A test specimen, 1 inch in diameter and 0.136 inch thick, is prepared therefrom. Two metal electrodes were attached to the test specimen and various voltages applied. Temperatures of the test specimen were taken at these applied voltages. The results are as follows:

| Volts Applied (DC) | Temperature °F. |
| --- | --- |
| 0.87 | 95 |
| 2.10 | 120 |
| 4.00 | 147 |

Thus, it can be seen that the crosslinked carbon filled polymers of this invention have utility as electrical heating elements and the like.

Windshield wiper blades that can be heated to melt ice and reduce or eliminate fogging can be fabricated from the electrically conducting elastomers of this invention. Battery casings can be fabricated from the electrically conducting elastomers of this invention. A casing can be electrically connected to the battery thereby heating the casing which in turn will keep the battery warm, thus permitting easy engine starting in cold weather. Ignition cables for automobile engines can also be fabricated from the electrically conducting elastomers of this invention. The electrically conducting elastomers can be used in coaxial cables as a coating or layer over the electrically conductive metal core to improve the electrical geometry of the core by eliminating surface irregularities of the metal core thereby producing a concentric area of uniform voltage stress distribution between the core the the surrounding dielectric material. Additional uses for the novel electrically conducting elastomers of this invention are as outer conductive jackets for shielded cables and in the fabrication of electrical heating members. Thus, strips of the elastomer can be affixed to panels to heat walls, floors, ceilings, seats and the like. Also, in tape form, the elastomers can be used as a heating element in electric blankets, and as a wrapping for water pipes to prevent freezing in extreme cold.

The electrically conducting elastomers of this invention can be used to manufacture conductive gaskets and O-rings for applications in which various parts of metal equipment are required to be at common (ground) potential. Other uses include the manufacture of electrically heated sections to de-ice moving surfaces and joints of aircraft where flexibility must be maintained and as conductive surfaces for floors, furniture and the like in areas of explosive hazards such as surgical operating rooms.

Certain embodiments of the invention are further illustrated by the drawing in which.

Figure 1:
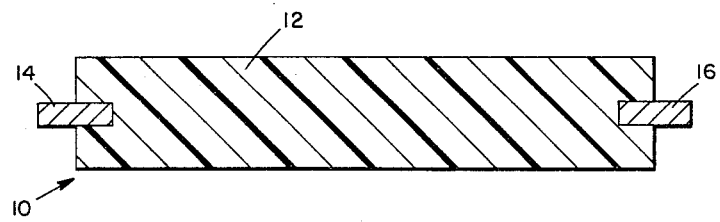
FIG. 1 is a view in cross section of a heating panel.

In FIG. 1 there is shown a heating panel 10 comprised of a sheet 12 of the electrically conducting elastomer of this invention having embedded therein two metal electrodes 14 and 16 adapted for connection to a source of electrical current. A metal layer, such as a layer of aluminum foil or the like, can be applied to at least a portion of at least one surface of sheet 12 to provide for rapid heat transfer where required. A metal layer can be secured to the sheet 12 by any convenient means such as by means of an adhesive. Additionally a metal layer can be deposited on at least a portion of the sheet 12 by vacuum deposition techniques known in the art.

Figure 2:
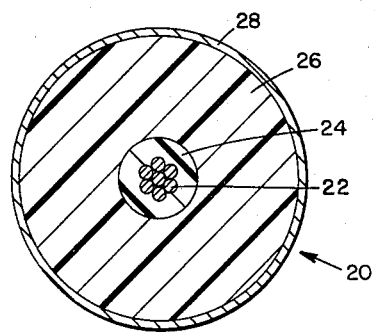
FIG. 2 is a view in cross section of an insulated electrical conductor.

In FIG. 2 there is shown an electrically insulated electrical conductor 20 comprised of a core 22 comprised of a plurality of metal electrical conductors having a coating or layer 24 of the electrically conducting elastomer of this invention disposed over the core 22 and an electrically insulating layer 26, such as crosslinked polyethylene, disposed over the layer 24. Disposed over layer 26 is a metal jacket 28. The metal electrical conductors of which core 22 is comprised can be copper, aluminum or the like electrically conducting metal or metal alloy.

It is to be understood that the above description and examples are illustrative of this invention and not in limitation thereof.

What I claim and desire to protect by Letters Patent is:

1. As a new article of manufacture, an electrically conducting elastomer consisting essentially of a crosslinked epihalohydrin polymer having essentially uniformly dispersed therein finely divided carbon having a particle size of less than about 100 millimicrons in an amount of from about 50 parts to about 120 parts by weight for each 100 parts by weight of polymer, said electrically conducting elastomer having a resistivity of less than about 1,000 ohm-cm.

2. The electrically conducting elastomer of claim 1 wherein the polymer is poly(epichlorohydrin).

3. The electrically conducting elastomer of claim 1 wherein the polymer is a copolymer of epichlorohydrin and ethylene oxide wherein from about 30 mole percent to about 70 mole percent of the copolymer is derived from epichlorohydrin.

4. The electrically conducting elastomer of claim 1 wherein the polymer is a copolymer of epichlorohydrin and propylene oxide wherein from about 30 mole percent to about 70 mole percent of the copolymer is derived from epichlorohydrin.

5. A flexible heating element comprising the electrically conducting elastomer of claim 1 and means secured to said elastomer for connecting said elastomer to a source of electrical current.

6. A flexible heating element comprising the electrically conducting elastomer of claim 2 and means secured to said elastomer for connecting said elastomer to a source of electric current.

7. A flexible heating element comprising the electrically conducting elastomer of claim 3 and means secured to said elastomer for connecting said elastomer to a source of electric current.

8. A flexible heating element comprising the electrically conducting elastomer of claim 4 and means secured to said elastomer for connecting said elastomer to a source of electric current.

9. A coated electrical conductor comprising, in combination, a metallic electrical conductor and applied thereto a coating of the electrically conducting elastomer of claim 1.

10. A coated electrical conductor comprising, in combination, a metallic electrical conductor and applied thereto a coating of the electrically conducting elastomer of claim 2.

11. A coated electrical conductor comprising, in combination, a metallic electrical conductor and applied thereto a coating of the electrically conducting elastomer of claim 3.

12. A coated electrical conductor comprising, in combination, a metallic electrical conductor and applied thereto a coating of the electrically conducting elastomer of claim 4.

13. A heating panel comprised of a sheet of the electrically conducting elastomer of claim 1, means secured to said elastomer for connecting said elastomer to a source of electrical current, and a layer of a heat conducting metal disposed on at least a portion of at least one surface of said sheet.

14. A heating panel comprised of a sheet of the electrically conducting elastomer of claim 2, means secured to said elastomer for connecting said elastomer to a source of electrical current, and a layer of a heat conducting metal disposed on at least a portion of at least one surface of said sheet.

15. A heating panel comprised of a sheet of the electrically conducting elastomer of claim 3, means secured to said elastomer for connecting said elastomer to a source of electrical current, and a layer of a heat conducting metal disposed on at least a portion of at least one surface of said sheet.

16. A heating panel comprised of a sheet of the electrically conducting elastomer of claim 4, means secured to said elastomer for connecting said elastomer to a source of electrical current, and a layer of a heat conducting metal disposed on at least a portion of at least one surface of said sheet.

* * * * *